Feb. 24, 1953 W. R. PETERSON 2,629,504
RECIPROCATING FLOOR BOTTOM FOR UNLOADING VEHICLES
Filed March 2, 1950 4 Sheets-Sheet 1

INVENTOR
WALTER R. PETERSON
Paul O. Pippel
ATT'Y

INVENTOR
WALTER R. PETERSON
ATT'Y

Feb. 24, 1953 W. R. PETERSON 2,629,504
RECIPROCATING FLOOR BOTTOM FOR UNLOADING VEHICLES
Filed March 2, 1950 4 Sheets-Sheet 3
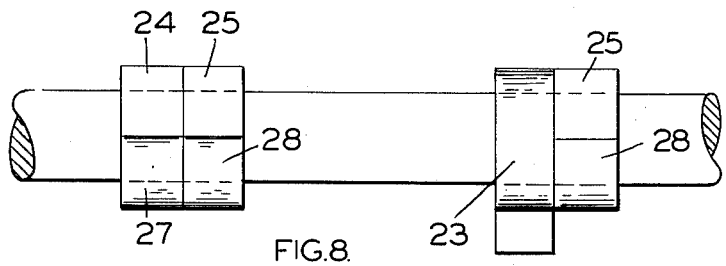
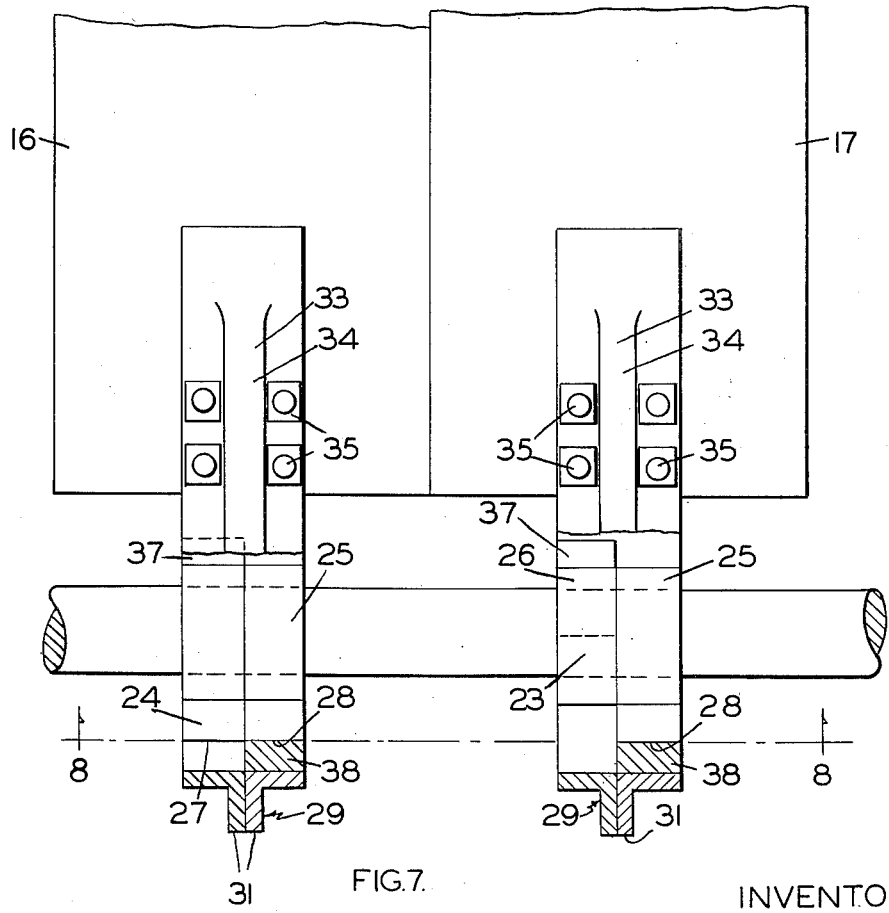
INVENTOR
WALTER R. PETERSON
ATT'Y Feb. 24, 1953 W. R. PETERSON 2,629,504
RECIPROCATING FLOOR BOTTOM FOR UNLOADING VEHICLES
Filed March 2, 1950 4 Sheets-Sheet 4

INVENTOR
WALTER R. PETERSON
ATT'Y

Patented Feb. 24, 1953

2,629,504

UNITED STATES PATENT OFFICE 2,629,504

RECIPROCATING FLOOR BOTTOM FOR UNLOADING VEHICLES

Walter R. Peterson, Hinsdale, Ill., assignor to International Harvester Company, a corporation of New Jersey Application March 2, 1950, Serial No. 147,301

12 Claims. (Cl. 214—83.3)

1

This invention relates to an improved unloading mechanism especially adapted for unloading a vehicle. More specifically the invention relates to an improved vehicle having a bottom adapted to be reciprocated for discharging a load carried by the vehicle.

It is the prime object of this invention to provide an improved vehicle having an efficient and inexpensive mechanism operable for discharging a load carried by the vehicle.

Another object is to provide a vehicle having a load carrying bottom, the bottom consisting of a plurality of longitudinally extending bottom portions constructed to reciprocate for discharging a load carried by the vehicle.

Still another object is to provide a vehicle having a load carrying bottom, the bottom including transverse contiguously positioned longitudinal portions, the portions being movable successively in a longitudinal direction, said portions being thereupon movable in concert in an opposite direction for unloading a vehicle.

A still further object is to provide a vehicle with a load carrying bottom, the bottom consisting of a plurality of first and second floor portions positioned in transverse contiguous relation, the first and second portions being alternately positioned, and alternate portions being movable successively in a forward direction independently of a load carried on the bottom, all the portions being movable rearwardly as a unitary structure for moving a load to the rear of the vehicle and for discharging the load.

A still further object is to provide a reciprocating bottom for unloading a vehicle, the bottom consisting of floor portions which may be successively moved in a forward direction independently of a load carried by the portions, the vehicle also including a cam actuated mechanism for moving the portions in a rearward direction as a unitary structure for moving and discharging the load from the rear of the vehicle.

These and other objects will become more fully apparent from a reading of the specification when examined in connection with the drawings.

2

Figure 1:
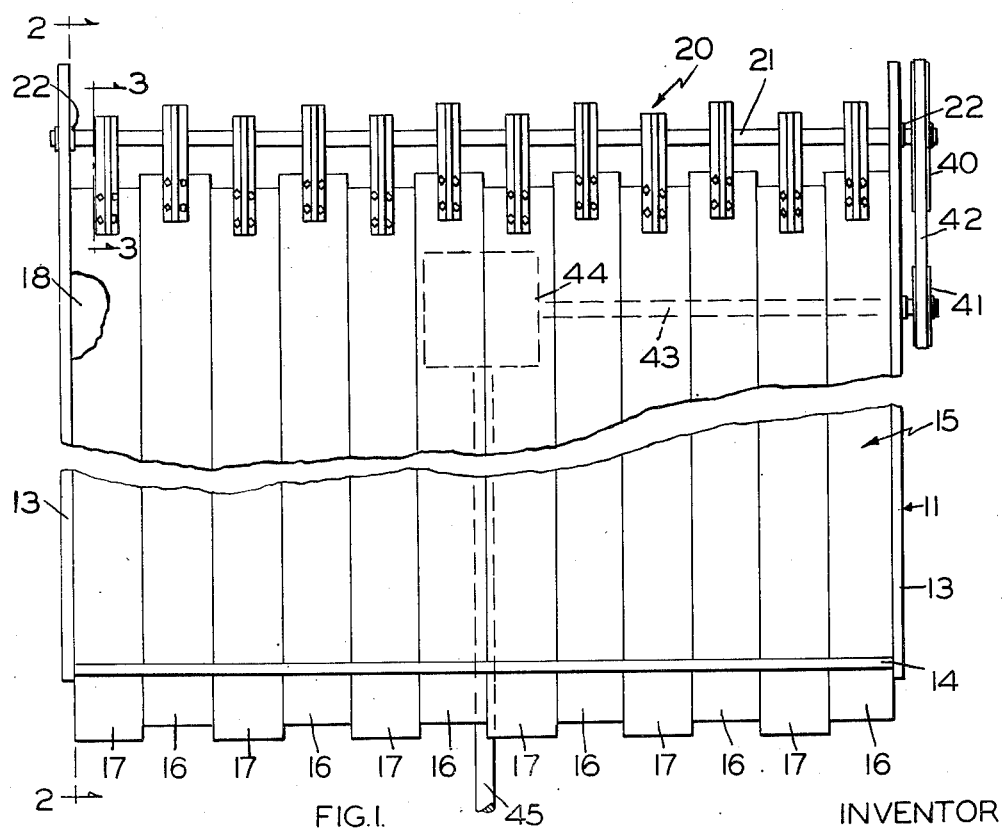
Fig. 1 is a plan view of an improved vehicle having a plurality of reciprocating floor portions forming an important part of the invention.
Figure 4:
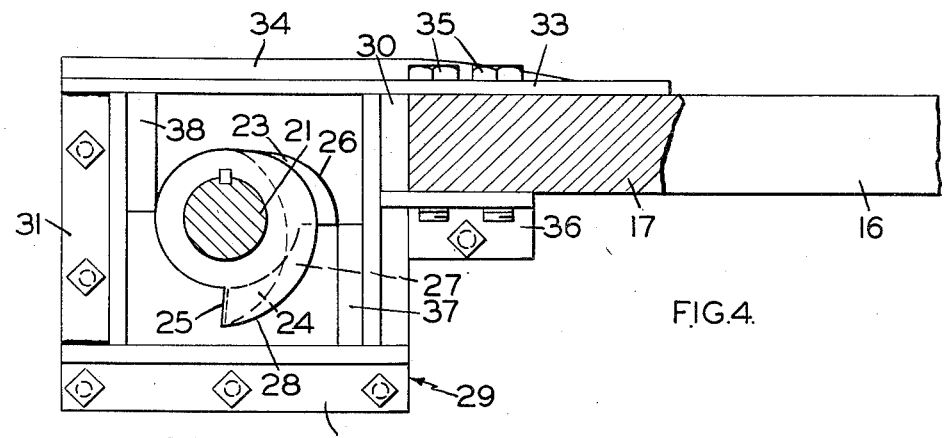

Fig. 4 is an elevational view similar to Fig. 1 showing a stage in the operating cycle of a reciprocating mechanism.

Figure 3:
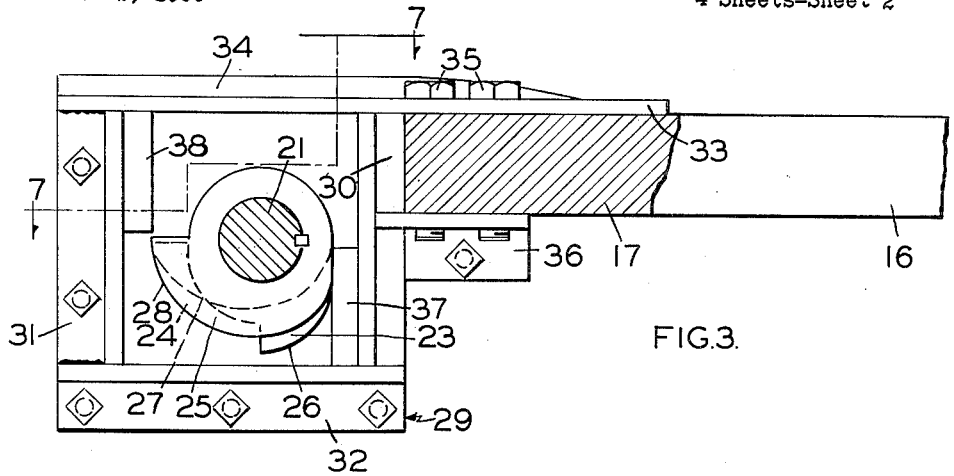
Fig. 3 is a sectional view through a reciprocating mechanism for reciprocating the floor of the vehicle, the view being taken substantially along the line 3—3 of Fig. 1.
Figure 5:
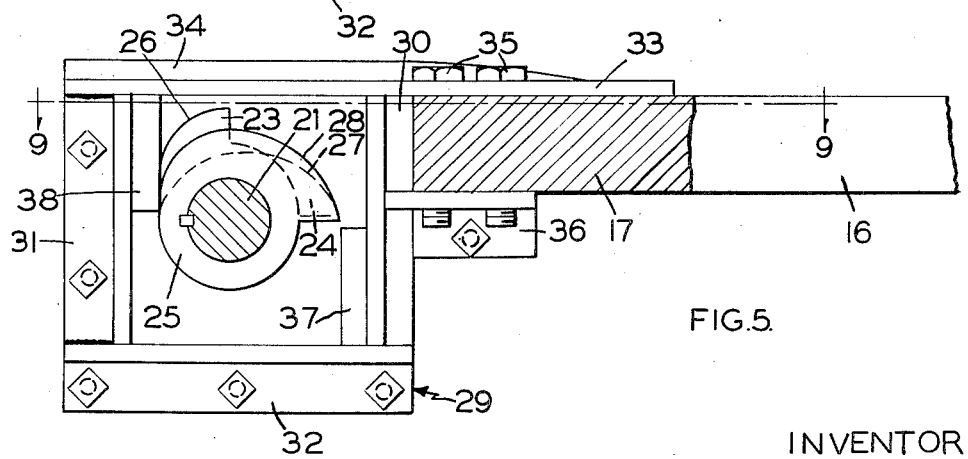

Fig. 5 is a side elevational view similar to Figs. 3 and 4 showing a certain stage in the cycle of operation of the reciprocating mechanism.

Figure 6:
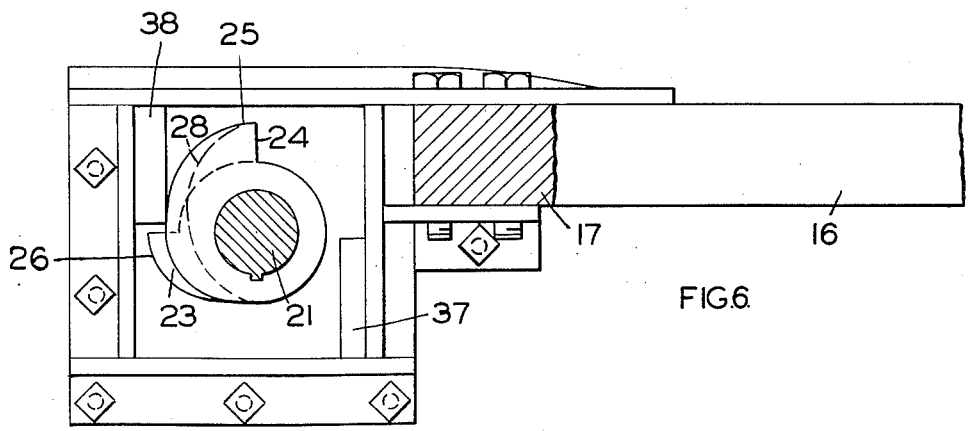

Fig. 6 is a view similar to Figs. 3, 4, and 5 showing another stage in the operation.

Fig. 7 is a sectional fragmentary plan view taken substantially along the line 7—7 of Fig. 3.

Fig. 8 is a fragmentary view of a cam structure taken substantially along the line 8—8 of Fig. 7.

Figure 9:
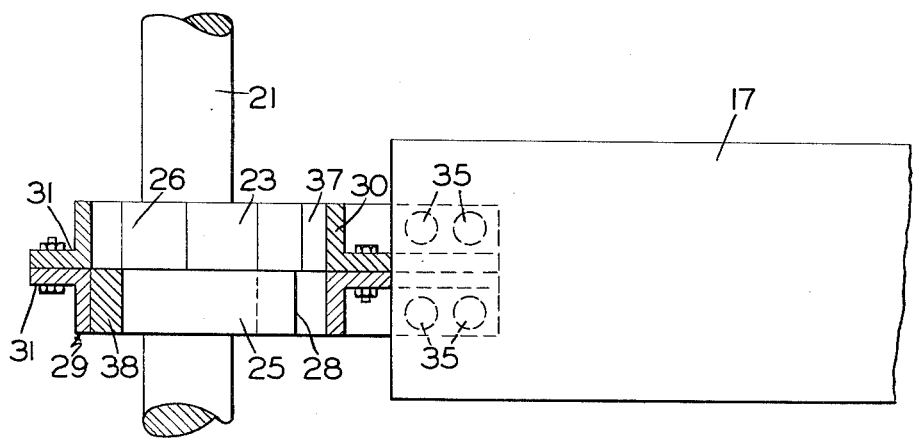

Fig. 9 is a sectional plan view of a cam and follower unit, the view being taken substantially along the line 9—9 of Fig. 5.

Figure 2:
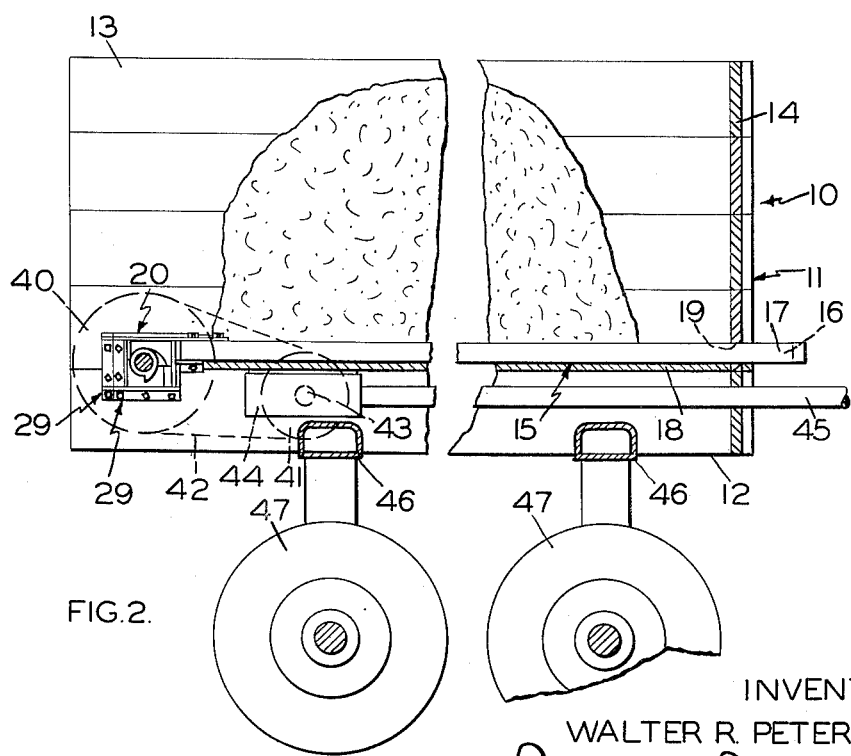
Fig. 2 is a sectional side view of the vehicle shown in Fig. 1, the section being taken substantially along the line 2—2 of Fig. 1.

A vehicle generally designated by the reference character 10, as best shown in Figs. 1 and 2, consists of a body 11 supported on a frame construction 12. The body 11 includes side walls 13 which extend upwardly from the frame 12. The forward end of the body 11 is closed by means of a front wall 14.

A floor or bottom generally designated by the reference character 15 is supported on the frame 12. The floor comprises a plurality of first bottom boards or floor portions 16 which are positioned in alternate relation between second bottom boards or floor portions 17. The bottom portions 16 and 17 are positioned in transverse substantially contiguous relation, the portions extending longitudinally with respect to the vehicle 10. For the purpose of supporting the bottom portions 16 and 17, a bottom support 18 is provided. The bottom support 18 is best shown in Figs. 1 and 2 and may consist of a conventional type of floor bottom. The bottom support 18 provides the supporting structure for carrying the longitudinally extending floor portions 16 and 17. In this manner the floor portions are fully supported along their entire length although it can readily be seen that a plurality of transversely extending supporting members might also be utilized for the purpose. The first and second bottom portions 16 and 17 project forwardly of the body 11 through a slot 19 formed in the front wall 14.

The first and second bottom portions or boards 16 and 17 are positioned so that they may readily be reciprocated. Power to effect such reciprocation is provided by means of a floor actuating or reciprocating mechanism generally designated by the reference character 20. The reciprocating mechanism 20 comprises a cam-shaft 21 which extends transversely at the rear of the body 11 and is journaled for rotation about a horizontal axis on bearings 22 supported by the side walls 13. The cam-shaft 21 has supported thereon a plurality of forwardly pushing cams 23 and 24 which are axially spaced on the cam-shaft 21. The cam-shaft further includes a plurality of rearwardly pushing cams 25 which are also spaced in axial relation to one another and with respect to the cams 23 and 24. The arrangement of the cams is best shown in Fig. 7, this view showing a pair of longitudinal floor portions 16 and 17 positioned in contiguous relation. In Fig. 1 it can be seen that the floor portions 16 and 17 are positioned in adjacent relation transversely across the full width of the vehicle 10. Each of the floor portions 16 is provided with a pair of cams 24 and 25 as shown in Fig. 7. Likewise each of the floor portions 17 is provided with a pair of cams 25 and 26 as shown in Fig. 7.

The cams 23, 24, and 25 are all keyed to the shaft 21 for rotation therewith. The cams 23, 24, and 25 are respectively provided with cam surfaces 26, 27, and 28. All of the cam surfaces 26 of the cams 23 extending across the shaft in axially spaced relation are positioned in the same circumferential position. The cam surfaces 27 and 28 as best shown in Fig. 3 are all positioned in the same circumferential position with respect to each other, these surfaces, however, being at a different circumferential position on the shaft 21 than the cam surfaces 26. The reason for this positioning will be obvious from the description of the operation.

As best shown in Figs. 1, 3, 4, and 5 the reciprocating mechanism 20 also comprises a plurality of transversely spaced cam follower units 29, one follower unit 29 being provided for each of the bottom portions 16 and 17. The cam follower units 29, as best shown in Figs. 3 and 7, comprise upwardly extending angles 30 connected together in back-to-back relation. The angles 30 form the front structure of each cam follower unit 29. Each unit 29 also includes a pair of rearwardly upwardly extending angles 31 which are also connected in back-to-back relation. The angles 30 and 31 are connected at their lower ends by means of bottom straps 32 which may also consist of angle shaped members. A plate 33 connects the upper ends of the angles 30 and 31 thereby forming a generally square shaped structure. The plates 33 having ribs 34 extend forwardly and overlap each of the bottom portions 16 and 17 and are connected thereto by means of bolts 35 which extend through the sections 16 and 17 and are secured thereto by means of connector plates 36. In this manner a cam follower unit 29 is securely connected to each floor section 16 and 17. The component parts of the cam follower units 29 may be connected together by conventional methods, the present embodiment showing bolt and nut connections. A forward cam engaging plate 37 is connected to the lower ends of the angles 30 on each cam follower unit 29. A rear cam engaging plate 38 is connected adjacent the upper ends of the rear upwardly extending angles 31 of each cam follower unit 29. The plate 37 is positioned for engagement by the forwardly pushing cams 23 and 24 and the plate 38 is positioned for engagement by the cam 25.

Power for rotating the cam shaft 21 is provided by means of a sheave 40 which is connected to the shaft 21 as best shown in Figs. 1 and 2. The sheave 40 is in longitudinal alignment with a sheave 41 journaled on one of the side walls 13. A belt 42 is trained about the sheaves 40 and 41 in driving relation. The sheave 41 is rotated by means of a transverse shaft 43 which is driven from a gear box 44 connected to the underneath side of the bottom support 18. Power to the gear box 44 is derived from a longitudinally extending drive shaft 45 which may be rotated from the power take-off, not shown, of a tractor.

The vehicle is supported for movement on axle supporting structures 46 which in turn are supported on ground wheels 47 as best shown in Fig. 2.

The operation

As best shown in Fig. 2, a load of material may be carried by the vehicle 10. The material rests upon the substantially flat and even surface presented by the contiguously positioned floor or bottom portions 16 and 17. When it is desired to unload the vehicle the longitudinal shaft 45 is driven thereby effecting rotation of the shaft 43 from power derived through the gear box 44. The belt 42 rotates the sheave 40 which in turn causes rotation of the cam-shaft 21. The complete cycle of the operation during rotation of the cam-shaft 21 is best shown in Figs. 3 through 7, and 9, each figure showing a certain position or step in the cycle of operation. The first step in the cycle results when the cam-shaft 21 is rotated in a counter-clockwise direction. As best shown in Fig. 3, the cam surface 26 of the cam 23 engages the cam engaging plate 37 thereupon pushing forwardly on the plate 37. The cam follower 29 of each floor portion 17 thereupon moves each floor portion 17 in a forward direction. The description is generally confined to the operation of one set of cams but it must be understood that all of the floor portions 17 are moved simultaneously forwardly upon engagement of the circumferentially aligned surfaces 26 with the cam engaging plates 37. As best shown in Fig. 1, the portions 17 are positioned in alternate relation with respect to the portions 16. During movement of the portions 17 in a forward direction the portions 16 remain as a stationary surface and material resting thereon is maintained in substantially the same position irrespective of the forward movement of the portions 17. In other words, the portions 17 move forwardly independently of a load carried on the bottom since the portions 17 do not present a sufficiently great enough frictional surface for moving the load with respect to the stationary portions 16.

After the portions 17 have been moved into the forward position the cam 23 is in the position shown in Fig. 4. The second step in the operation takes place upon continued counterclockwise rotation of the shaft 21 whereupon the cam 24 is rotated so that the cam surface 27 engages the cam engaging plate 37 thereby pushing the portions 16 forwardly. The portions 16 are all also pushed simultaneously forwardly, with the portions 17 presenting a stationary supporting surface for the load. The portions 16 like the portions 17 move longitudinally independently of a load which is stationarily supported on the portions 17. In other words, movement of the floor portions 16 like movement of the floor portions 17 does not in any way affect the position of a load which is carried on the bottom of the vehicle. Fig. 4 is particularly significant to show the cam 23 just as the cam surface 26 moves away from one of the plates 37. The cam 24 is at this point ready to assume its engaging position with respect to the cam engaging plates 37 provided on the follower units 29 of the portions 16. The second cycle of the operation therefore can be stated as concluding when both of the portions 16 and 17 have been respectively moved forwardly by the cams 24 and 23.

The third step in the operation of the cams is best shown in Figs. 5, 6, and 9. As previously indicated, each portion 16 and 17 is actuated or reciprocated by means of a pair of cams. The portion 16 is reciprocated by means of cams 24 and 25 and the portion 17 is reciprocated by means of cams 23 and 25. The cams 25 have cam surfaces 28 which are all in alignment at the same circumferential position on the cam-shaft 21. The surfaces 28 are provided to engage the rear cam engaging plates 38 one of which is positioned on each cam folower unit 29. In the position of Fig. 5 the cam 24 has just completed pushing its respective floor portion 16 forwardly. Since both of the floor portions 16 and 17 are now in the forward position it is desired that both of these portions 16 and 17 be moved rearwardly longitudinally in concert or as a unitary structure. This is accomplished by continued rotation of the cam-shaft 21. As best shown in Fig. 6 such continued rotation causes each cam 25 to rotate its face 28 into engagement with each cam engaging plate 38. Since each surface 28 engages each cam engaging plate 38 simultaneously the boards or portions 16 and 17 are moved rearwardly in concert or, in other words, in a unitary manner. A load carried on the boards 16 and 17 is therefore simultaneously moved rearwardly to the rear end of the vehicle 10 whereupon such continued movement causes dumping or discharge of the material.

The cycle of operation can thus be stated as including three steps. The first step moves the floor boards or portions 17 forwardly independently of the boards 16 which remain stationary to support a load of material. The second step is to move the boards 16 forwardly independent of the boards 17 which are now positioned in the forward stationary position. The third step is to move the boards in concert rearwardly thereby effecting rearward movement and subsequent discharge of the load. The extent of the rearward and forward movements of the boards or floor portions 16 and 17 is, of course, determined by the size of each of the respective forward and rearward moving cams. The cams shown in the present disclosure are relatively small and the forward and rearward action is therefore necessarily quite limited in length. However, the speed at which the load may be moved can be adjusted by varying the R. P. M. of the shaft 21. A complete cycle of operation takes place upon one complete rotation of the cam-shaft 21. Thus by increasing the speed of rotation of the cam-shaft the number of complete cycles per minute can be increased and with the speed up of the cycles the travel of the load to the rear of the vehicle correspondingly increases.

It is believed clear that applicant has provided a novel and improved bottom or floor for a vehicle, the bottom consisting of an effective construction designed to quickly unload material which may be supported by the bottom.

It must be understood that a preferred embodiment of the invention has been shown and that changes in operation and design may be made which do not depart from the spirit of the invention as disclosed nor the scope thereof as defined in the appended claims.

What is claimed is:

1. A vehicle having a load supporting body, means for discharging a load from said body comprising a plurality of horizontally extending first and second floor portions carried on said body in substantially contiguous relation to provide a substantially smooth vehicle bottom, and means engaging said first and second floor portions for successively moving said floor portions in one direction, said means being arranged and constructed to move said first and second floor portions in concert in an opposite direction.

2. An unloading device for discharging material carried by the device comprising horizontally extending first and second floor boards positioned in substantially parallel contiguous relation to provide a substantially smooth floor, and means connected to said floor boards for initially moving the first and second floor boards successively in one direction and subsequently moving said first and second floor boards in concert in an opposite direction.

3. An unloading device for a vehicle comprising horizontally extending first and second floor boards positioned in contiguous relation to provide a substantially smooth floor adapted to carry a load of material, and power actuated means connected to the first and second floor boards for initially moving said first and second floor boards successively in one direction and for subsequently moving said floor boards in concert in an opposite direction.

4. A vehicle having a body, unloading means for said vehicle comprising a plurality of horizontally extending first and second floor boards positioned in transverse adjacent relation to provide a load supporting floor, and power actuated means carried by said body for engaging said first and second floor boards to successively move said boards in one direction, said power actuated means being arranged to thereupon move said second boards in concert in an opposite direction.

5. A vehicle having a body, unloading means for said vehicle comprising a plurality of horizontally extending floor boards positioned in adjacent relation to provide a load supporting surface, and power actuated means carried by said body for engaging the floor boards thereby moving alternately positioned boards successively in one direction, and thereupon moving said boards in unitary relation in a second direction.

6. A wheeled vehicle having a body, a bottom for said vehicle comprising a plurality of longitudinally extending boards positioned in substantially parallel adjacent relation, means for supporting said boards on said body to provide a supporting surface adapted to carry a load, power actuated means carried by said body, rotatable means engageable with the boards for moving the boards successively in one direction whereby a load carried on the surface is maintained at substantially the same position, and second rotatable means for moving the boards as a unitary structure in an opposite direction whereby a load is moved with respect to the supporting surface.

7. In a vehicle, a vehicle bottom comprising longitudinally extending first and second bottom boards positioned in substantially contiguous relation to provide a load carrying surface, means for moving the first and second boards successively forwardly independently of a load carried on the surface, said means including a cam-shaft rotatably mounted on the vehicle, first and second cams axially spaced on said cam-shaft, said cams having first and second camming surfaces, the first camming surface being circumferentially spaced with respect to the second camming surface, a first and second cam follower respectively on the first and second bottom boards engaged successively by the camming surfaces during rotation of said cam-shaft, a third cam on the cam-shaft, said third cam having a third camming surface circumferentially spaced with respect to the first and second camming surfaces, a cam engaging means connected to the first and second bottom boards, said cam engaging means being engaged by the third camming surface during rotation of the cam shaft for moving said first and second bottom boards in concert rearwardly thereby moving a load carried on the surface for discharging the same from the vehicle.

8. In a vehicle, a vehicle bottom comprising first and second longitudinally extending bottom boards positioned in adjacent relation to provide a load carrying surface, a cam-shaft rotatably connected to the vehicle adjacent to and extending transversely with respect to the bottom boards, first and second cams axially spaced on the cam-shaft, said cams respectively having first and second camming surfaces, said camming surfaces being circumferentially spaced at different positions on said cam-shaft, first and second cam engaging members respectively on said first and second boards, actuating means connected to said cam-shaft for rotating said shaft thereby rotating said first and second surfaces successively into engagement with the first and second cam engaging members for successively moving said sections longitudinally in a first direction independently of a load carried on the surface of the bottom, a third cam on said cam-shaft, said third cam having a third camming surface circumferentially spaced at a different position than either of said first and second camming surfaces, and a third cam engaging member connected to said first and second bottom boards, said actuating means being movable to rotate said shaft for rotating said third camming surface into engagement with said third cam engaging member for moving said first and second boards in concert and a load carried on the surface in an opposite direction.

9. In a vehicle, a vehicle bottom comprising longitudinally extending first and second bottom boards positioned in contiguous relation to provide a load carrying surface, first and second cams transversely positioned and rotatably mounted on said vehicle, the first and second cams each having a first and second camming surface, one camming surface being circumferentially spaced at a different position with respect to the other camming surface, actuating means for rotating said camming surfaces into engagement with the first and second boards whereby said boards are moved successively in a first longitudinal direction independently of a load carried on the surface, and a third cam mounted on said vehicle, said third cam having a third camming surface circumferentially spaced at a different position than said first and second camming surfaces, said actuating means being adapted to rotate said third camming surface into engagement with the first and second boards whereby said boards and a load carried thereon move in concert in an opposite direction.

10. In a vehicle having a frame, a horizontal bottom on said frame comprising a plurality of longitudinally extending floor boards positioned in contiguous relation to provide a load carrying surface, an unloading mechanism for said vehicle including a shaft journaled on the frame, a plurality of axially spaced cams on said shaft, means for rotating said cams into engagement with the floor boards for successively moving the floor boards horizontally in one direction, and rotatable means for engaging said floor boards for moving said boards horizontally in concert in an opposite direction.

11. In a vehicle comprising a frame having a plurality of longitudinally extending contiguously positioned first and second floor boards, a transversely extending member supporting said floor boards, said floor boards being slidable longitudinally with respect to said transverse member, a cam-shaft supported on the frame for rotation about a transverse axis, said cam-shaft including axially and circumferentially spaced cams, and means for rotating said cams into engagement with the floor boards thereby successively moving the first and second floor boards forwardly of the frame and independently of a load carried on the bottom, said means being movable for moving both the first and second floor boards simultaneously rearwardly thereby discharging a load carried on the floor boards.

12. In a vehicle comprising a frame having a plurality of longitudinally extending first and second floor boards spaced in alternating relation, a transversely extending member for slidably supporting said floor boards on the frame, a cam-shaft supported on the frame for rotation about a transverse axis, said cam-shaft including axially and circumferentially spaced first and second cams, and power means for rotating said first cams into engagement with the first floor boards for moving the first floor boards forwardly on the frame, said power means being arranged to thereafter move said second cams into engagement with the second floor boards for moving them forwardly on the frame, the power means being movable subsequently for moving said first and second floor boards rearwardly as a unitary structure.

WALTER R. PETERSON.

REFERENCES CITED

The following references are of record in the file of this patent:

UNITED STATES PATENTS

| Number | Name | Date |
|---|---|---|
| 220,336 | Brown | Oct. 7, 1879 |
| 1,000,828 | Lorillard | Aug. 15, 1911 |
| 1,452,139 | Bailey | Apr. 17, 1923 |
| 1,699,955 | Cope | Jan. 22, 1929 |

FOREIGN PATENTS

| Number | Country | Date |
|---|---|---|
| 488,669 | Great Britain | July 12, 1938 |